(12) United States Patent
Langworthy et al.

(10) Patent No.: US 10,193,951 B2
(45) Date of Patent: *Jan. 29, 2019

(54) BINDING CRUD-TYPE PROTOCOLS IN DISTRIBUTED AGREEMENT PROTOCOLS

(71) Applicant: Microsoft Technology Licensing, LLC, Redmond, WA (US)

(72) Inventors: David E. Langworthy, Medina, WA (US); John P. Shewchuk, Redmond, WA (US); William Lawrence Portnoy, Woodinville, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 400 days.

This patent is subject to a terminal disclaimer.

(21) Appl. No.: 15/057,284

(22) Filed: Mar. 1, 2016

(65) Prior Publication Data

US 2016/0197976 A1 Jul. 7, 2016

Related U.S. Application Data

(63) Continuation of application No. 13/452,433, filed on Apr. 20, 2012, now Pat. No. 9,313,252.

(51) Int. Cl.
*G06F 15/16* (2006.01)
*H04L 29/08* (2006.01)
(Continued)

(52) U.S. Cl.
CPC .......... *H04L 67/02* (2013.01); *H04L 67/1095* (2013.01); *H04L 67/28* (2013.01); *H04L 67/42* (2013.01); *G06F 11/182* (2013.01)

(58) Field of Classification Search
CPC ..... H04L 67/02; H04L 67/1095; H04L 67/28; H04L 67/42; G06F 11/182
See application file for complete search history.

(56) References Cited

U.S. PATENT DOCUMENTS 7,409,431 B2 * 8/2008 Yamaguchi ........ H04N 1/00132
380/201
9,313,252 B2 * 4/2016 Langworthy ....... H04L 67/1095
(Continued)

FOREIGN PATENT DOCUMENTS

CN 101589599 A 11/2009
JP 2010122773 A 6/2010
(Continued)

OTHER PUBLICATIONS

Vieira, et al., "Treplica: Ubiquitous Replication", In Proceedings of 26th Brazilian Symposium on Computer Networks and Distributed Systems, May 2008, pp. 427-440.
(Continued)

*Primary Examiner* — Moustafa M Meky
(74) *Attorney, Agent, or Firm* — Workman Nydegger (57) ABSTRACT

A method implemented in a computing system includes receiving communications from a client device to a first web server via the Internet. The communications are associated with a plurality of operations requested by the client device and to be performed by a web service implemented by both the first web server and a second web server. The method further includes, responsive to the received communications, arriving at a consensus between the first and second web servers regarding an agreed-upon order of operations to be performed in response to the requested operations and, upon arriving at the consensus, generating a response by performing the requested operations in the agreed-upon order at both the first and second web servers. The web service has the same state subsequent to performing the requested operations at the first and second web servers. The generated response is returned to the client device via the Internet.

20 Claims, 5 Drawing Sheets

(51) Int. Cl.
*H04L 29/06* (2006.01)
*G06F 11/18* (2006.01)

(56) References Cited

U.S. PATENT DOCUMENTS

| | | | |
|---|---|---|---|
| 2004/0111493 A1* | 6/2004 | Yamaguchi | H04N 1/00132 709/219 |
| 2011/0022574 A1 | 1/2011 | Hansen | |
| 2011/0022883 A1 | 1/2011 | Hansen | |
| 2011/0099147 A1 | 4/2011 | McAlister et al. | |
| 2011/0225506 A1 | 9/2011 | Casalaina et al. | |
| 2012/0173607 A1 | 7/2012 | Connan et al. | |
| 2012/0331038 A1* | 12/2012 | Yang | G06F 9/54 709/203 |
| 2015/0088982 A1 | 3/2015 | Johnson et al. | |

FOREIGN PATENT DOCUMENTS

| | | |
|---|---|---|
| JP | 2010191706 A | 9/2010 |
| JP | 2012048679 A | 3/2012 |
| WO | 2008091472 | 7/2008 |

OTHER PUBLICATIONS

"Final Rejection Received for U.S. Appl. No. 13/452,433", dated Feb. 18, 2015, 10 Pages.

"Non-Final Rejection Received for U.S. Appl. No. 13/452,433", dated Jul. 31, 2014, 8 Pages.

"Non-Final Rejection Received for U.S. Appl. No. 13/452,433", dated Jul. 1, 2015, 11 Pages.

"Notice of Allowance Received for U.S. Appl. No. 13/452,433", dated Dec. 3, 2015, 11 Pages.

Buzato, et al., "Dynamic Content Web Applications: Crash, Failover, and Recovery Analysis", In IEEE/IFIP International Conference on Dependable Systems and Networks, Jun. 2009, pp. 229-238.

"International Search Report & Written Opinion Received for PCT Application No. PCT/US2013/036519", dated Jul. 10, 2013, 10 Pages.

Lamport, Leslie, "Fast Paxos", In Distributed Computing, vol. 19, Issue 2, Jul. 8, 2006, pp. 79-103.

Lamport, Leslie, "The Part-Time Parliament", In ACM Transactions on Computer Systems (TOGS), vol. 16 Issue 2, May 1998, pp. 133-169.

"First Office Action and Search Report Issued in counterpart Chinese Patent Application No. 201380020950.4", dated Oct. 17, 2016, 13 Pages.

Somerset. N.J., "AEP Networks prevents interruption to cloud services", Retrieved at «http://www.aepnetworks.com/index.php/news/press-releases/185-aep-networks-prevents-interruption-to-cloud-services», Apr. 20, 2011, pp. 2.

"Distributed Virtual Data Center for Enterprise and Service Provider Cloud", Retrieved at «http://www.cisco.com/en/US/prod/collateral/routers/ps9853/white_paper_c11-694882_ns975_Networking_Solutions_White_Paper.html», Retrieved Date : Mar. 30, 2012, pp. 34.

Chen, Wei, "An Overview of the Development of State Machine Approach", Retrieved at «http://www.cs.uwaterloo.ca/~hbo/material/20060113 19_bohu_distributed.pdf», Jun. 26, 2009, pp. 15.

"Office Action Issued in European Patent Application No. 13718743.1", dated Feb. 22, 2018, 6 Pages.

"Office Action Issued in Japanese Patent Application No. 2015-507075", dated Apr. 28, 2017, 8 Pages.

Kakizaki, Yoshio, "Consideration of the Interoperability Between Difference Authentication Technologies Using SCIM", In Proceedings of IEICE General Conference, Mar. 20, 2012, pp. 211.

Saitoh, Kenya, "Integrate as many Applications as you Wish—How to Utilize JAX-RS for Implementing a RESTful Web Service", In DB Magazine, Published by Shoeisha Printing Co. Ltd., vol. 20, Issue 5, Jul. 27, 2010, pp. 028-033.

"Second Office Action Issued in Chinese Patent Application No. 201380020950.4", dated Jun. 1, 2017, 6 Pages.

\* cited by examiner

BINDING CRUD-TYPE PROTOCOLS IN DISTRIBUTED AGREEMENT PROTOCOLS

CROSS-REFERENCE TO RELATED APPLICATION(S)

This application is a continuation of and claims priority to U.S. patent application Ser. No. 13/452,433, filed on Apr. 20, 2012, the disclosure of which is incorporated herein in its entirety.

BACKGROUND

Services that are offered over the Internet, such as so-called "cloud" services can suffer from interruptions which can degrade the user experience. In addition to degrading the user experience, such interruptions can have a large organizational impact in terms of business cost such as actual money lost as well as loss of goodwill.

SUMMARY

This Summary is provided to introduce a selection of concepts in a simplified form that are further described below in the Detailed Description. This Summary is not intended to identify key features or essential features of the claimed subject matter.

Various embodiments enable redundant or replica services, such as "cloud" services, to be run at geographically distributed locations. Each replica is capable of performing operations that are generally, identically performed across all replicas. In the event of an interruption at one location, services in other locations can quickly and automatically take over operations.

In one or more embodiments, a Distributed Agreement Protocol is utilized to bind a CRUD-type protocol as a state machine. Binding takes place through the use of a reverse proxy that is located at each of the locations at which the service is distributed. In at least some embodiments, the Distributed Agreement Protocol is implemented as the Paxos protocol or a variant thereof, and/or the CRUD-type protocol comprises Hypertext Transport Protocol (HTTP).

BRIEF DESCRIPTION OF THE DRAWINGS

The same numbers are used throughout the drawings to reference like features.

DETAILED DESCRIPTION

Various embodiments enable redundant or replica services, such as "cloud" services, to be run at geographically distributed locations. Each replica is capable of performing operations that are generally, identically performed across all replicas. In the event of an interruption at one location, services in other locations can quickly and automatically take over operations.

In one or more embodiments, a Distributed Agreement Protocol is utilized to bind a CRUD-type protocol as a state machine. Binding takes place through the use of a reverse proxy that is located at each of the locations at which the service is distributed. In at least some embodiments, the Distributed Agreement Protocol is implemented as the Paxos protocol or a variant thereof, and/or the CRUD-type protocol comprises Hypertext Transport Protocol (HTTP). It is to be appreciated and understood, however, that the techniques described in this document can be employed in connection with any suitable stateless REST (Representational State Transfer) protocols. As will be appreciated by the skilled artisan, REST defines a set of architectural principles by which web services can be designed to focus on a system's resources, including how resource states are addressed and transferred over HTTP by a wide range of clients written in different languages. As will be appreciated by the skilled artisan, REST-type architectures are utilized in connection with clients and servers. Clients typically initiate requests to servers which then process the request and return appropriate responses. Requests and responses are built around the transfer of representations of resources. A resource can include any coherent and meaningful concept that may be addressed. A representation of a resource is typically a document that captures the current or intended state of a resource. The client initiates a communication by sending a request when it is ready to make a transition to a new state. While one or more requests are outstanding, the client is considered to be in transition. The representation of each state can contain links that may be used next time the client chooses to initiate a new state transition.

In the following discussion, an example environment is first described that may employ the techniques described herein. Example procedures are then described which may be performed in the example environment as well as other environments. Consequently, performance of the example procedures is not limited to the example environment and the example environment is not limited to performance of the example procedures.

Example Environment

Figure 1:
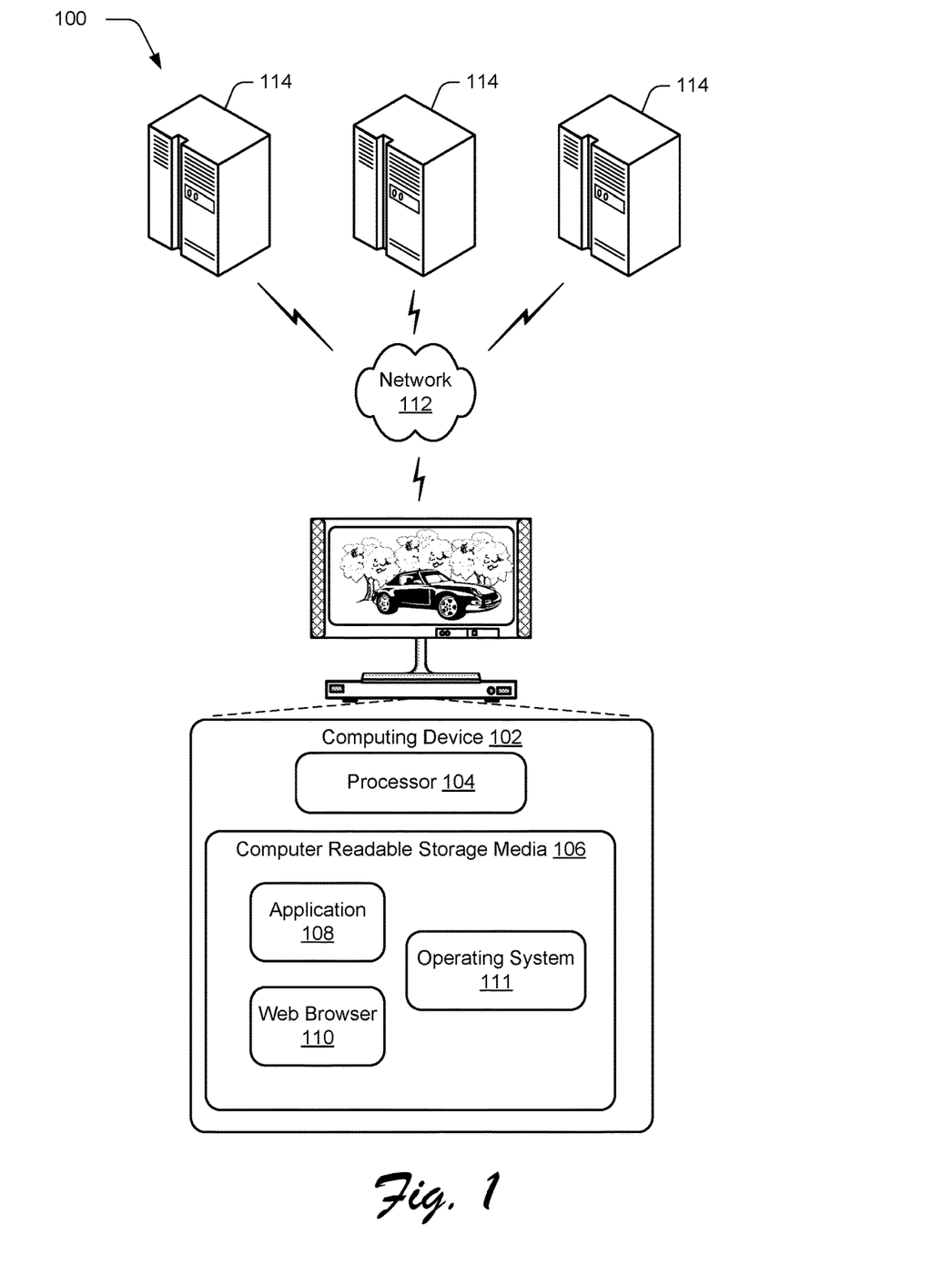
FIG. 1 illustrates an example operating environment in accordance with one or more embodiments.

FIG. 1 illustrates an operating environment in accordance with one or more embodiments, generally at 100. Environment 100 includes a computing device 102 in the form of a local client machine having one or more processors 104, one or more computer-readable storage media 106, one or more applications 108 that resides on the computer-readable storage media and which are executable by the processor 104. Computing device 102 also includes a web browser 110 and an operating system 111 that operates as described below.

Computing device 102 can be embodied as any suitable computing device such as, by way of example and not limitation, a desktop computer, a portable computer, a handheld computer such as a personal digital assistant (PDA), mobile phone, television, tablet computer, and the like. One of a variety of different examples of a computing device 102 is shown and described below in FIGS. 4 and 5.

Applications 108 can include any suitable type of applications. The web browser 110 is configured to navigate via the network 112. Although the network 112 is illustrated as the Internet, the network may assume a wide variety of configurations. For example, the network 112 may include a wide area network (WAN), a local area network (LAN), a wireless network, a public telephone network, an intranet, and so on. Further, although a single network 112 is shown, the network 112 may be configured to include multiple networks.

The browser may be configured to navigate via the network 112 to interact with content available from one or more servers 114, such as web servers, as well as communicate data to the one or more servers 114, e.g., perform downloads and uploads. The servers 114 may be configured to provide one or more services, such as web services (also referred to as "cloud services") that are accessible via the network 112 and can be consumed by computing device 102. Examples of such services include map services, email, web pages, photo sharing sites, social networks, content sharing services, media streaming services, data retrieval and/or displaying services and so on.

One or more of the applications 108 may also be configured to access the network 112, e.g., directly themselves and/or through the browser. For example, one or more of the applications 108 may be configured to communicate messages, such as email, instant messages, and so on. In additional examples, an application 108, for instance, may be configured to access a social network, obtain weather updates, interact with a bookstore service implemented by one or more of the web servers 114, support word processing, provide spreadsheet functionality, support creation and output of presentations, and so on.

Thus, applications 108 may also be configured for a variety of functionality that may involve direct or indirect network 112 access. For instance, the applications 108 may include configuration settings and other data that may be leveraged locally by the application 108 as well as synchronized with applications that are executed on another computing device. In this way, these settings may be shared by the devices. A variety of other instances are also contemplated. Thus, the computing device 102 may interact with content in a variety of ways from a variety of different sources.

In the illustrated and described embodiments, servers 114 can each support a web service which is a redundant web service. That is, each redundant web service is a copy or replica of the other. These web services can be, and typically are run or executed at geographically distributed locations. Each replica service is capable of performing operations that are generally, identically performed across all replicas. In the event of an interruption at one location, services in other locations can quickly and automatically take over operations.

In one or more embodiments, a Distributed Agreement Protocol is utilized to bind a CRUD-type protocol as a state machine. Binding takes place through the use of a reverse proxy that is located at each of the locations at which the service is distributed. In at least some embodiments, the Distributed Agreement Protocol is implemented as the Paxos protocol or a variant thereof, and/or the CRUD-type protocol comprises the HTTP protocol, as will become apparent below.

Generally, any of the functions described herein can be implemented using software, firmware, hardware (e.g., fixed logic circuitry), or a combination of these implementations. The terms "module," "functionality," and "logic" as used herein generally represent software, firmware, hardware, or a combination thereof. In the case of a software implementation, the module, functionality, or logic represents program code that performs specified tasks when executed on a processor (e.g., CPU or CPUs). The program code can be stored in one or more computer readable memory devices. The features of the techniques described below are platform-independent, meaning that the techniques may be implemented on a variety of commercial computing platforms having a variety of processors.

For example, the computing device 102 may also include an entity (e.g., software) that causes hardware or virtual machines of the computing device 102 to perform operations, e.g., processors, functional blocks, and so on. For example, the computing device 102 may include a computer-readable medium that may be configured to maintain instructions that cause the computing device, and more particularly the operating system and associated hardware of the computing device 102 to perform operations. Thus, the instructions function to configure the operating system and associated hardware to perform the operations and in this way result in transformation of the operating system and associated hardware to perform functions. The instructions may be provided by the computer-readable medium to the computing device 102 through a variety of different configurations.

One such configuration of a computer-readable medium is signal bearing medium and thus is configured to transmit the instructions (e.g., as a carrier wave) to the computing device, such as via a network. The computer-readable medium may also be configured as a computer-readable storage medium and thus is not a signal bearing medium. Examples of a computer-readable storage medium include a random-access memory (RAM), read-only memory (ROM), an optical disc, flash memory, hard disk memory, and other memory devices that may use magnetic, optical, and other techniques to store instructions and other data.

Having described an example environment, consider now a discussion of Distributed Agreement Protocols (DAPs) and how such DAPs can be utilized with the CRUD-type protocols, such as the HTTP protocol, to bind the CRUD-type protocol as a state machine.

Distributed Agreement Protocols

As information systems are more increasingly being shifted to distributed architectures because of the benefits like scalability, autonomy, and fault-tolerance implied from the essence of the distributed systems, the challenge of maintaining organization and synchronization within such distributed systems becomes more challenging. One goal of the distributed system is to have each processor or node that serves as a peer to efficiently and flexibly make an agreement on one common value which satisfies a particular agreement condition.

Distributed Agreement Protocols can be utilized in order to enable nodes within the distributed system to agree upon such common values in an efficient manner. One such Distributed Agreement Protocol is the Paxos protocol which is described just below. The Paxos protocol can be utilized in the various embodiments described in this document. It is to be appreciated and understood, however, that other Distributed Agreement Protocols can be utilized without departing from the spirit and scope of the claimed subject matter. For example, one such Distributed Agreement Protocol is the Query/Update (Q/U) protocol, as will be appreciated by the skilled artisan.

The Paxos Protocol

The following discussion describes the Paxos protocol, in general, as but one example of a Distributed Agreement Protocol that can be utilized to bind a CRUD-type protocol, e.g., HTTP, as a state machine within the Paxos protocol.

The Paxos protocol is used to implement a fault-tolerant distributed system. The discussion that follows explains the Paxos algorithm or protocol, which is obtained by the application of consensus to the state machine approach for building a distributed system. Consider first the consensus algorithm in the context of a problem. Assume a collection of processes that can propose values. A consensus algorithm ensures that a single one among the proposed values is chosen. If no value is proposed, then no value should be chosen. If a value has been chosen, then processes should be able to learn the chosen value. The safety considerations for consensus are that (1) only a value that has been proposed may be chosen, (2) only a single value is chosen, and (3) a process never learns that a value has been chosen unless it actually has been. The goal is to ensure that some proposed value is eventually chosen and, if a value has been chosen, then a process can eventually learn the value.

Three roles in the consensus algorithm are performed by three classes of agents: proposers, acceptors, and learners. In an implementation, a single process may act as more than one agent. Assume also that agents can communicate with one another by sending messages. In the context of this discussion, the customary asynchronous, non-Byzantine model is utilized, in which (1) agents operate at arbitrary speed, may fail by stopping, and may restart; since all agents may fail after a value is chosen and then restart, a solution is impossible unless some information can be remembered by an agent that has failed and restarted; and (2) messages can take arbitrarily long to be delivered, can be duplicated, and can be lost, but they are not corrupted.

Consider now the notion of choosing a value. The easiest way to choose a value is to have a single acceptor agent. A proposer sends a proposal to the acceptor, who chooses the first proposed value that it receives. Although simple, this solution is unsatisfactory because the failure of the acceptor makes any further progress impossible. Instead of a single acceptor, one can use multiple acceptor agents. A proposer sends a proposed value to a set of acceptors. An acceptor may accept the proposed value. The value is chosen when a large enough set of acceptors have accepted it. How large is large enough? To ensure that only a single value is chosen, one can let a large enough set consist of any majority of the agents. Because any two majorities have at least one acceptor in common, this works if an acceptor can accept at most one value. In the absence of failure or message loss, we want a value to be chosen even if only one value is proposed by a single proposer. This suggests the requirement:

P1. An acceptor must accept the first proposal that it receives.

However, this requirement raises a problem. Several values could be proposed by different proposers at about the same time, leading to a situation in which every acceptor has accepted a value, but no single value is accepted by a majority of them. Even with just two proposed values, if each is accepted by about half the acceptors, failure of a single acceptor could make it impossible to learn which of the values was chosen.

P1 and the requirement that a value is chosen only when it is accepted by a majority of acceptors imply that an acceptor must be allowed to accept more than one proposal. To allow this, we keep track of the different proposals that an acceptor may accept by assigning a (natural) number to each proposal, so a proposal consists of a proposal number and a value. To prevent confusion, we require that different proposals have different numbers. How this is achieved depends on the implementation, so for discussion purposes now, we just assume it. A value is chosen when a single proposal with that value has been accepted by a majority of the acceptors. In that case, we say that the proposal (as well as its value) has been chosen.

We can allow multiple proposals to be chosen, but we must guarantee that all chosen proposals have the same value. By induction on the proposal number, it suffices to guarantee:

P2. If a proposal with value v is chosen, then every higher-numbered proposal that is chosen has value v.

Since numbers are totally ordered, condition P2 guarantees the safety property that only a single value is chosen.

To be chosen, a proposal must be accepted by at least one acceptor. So, we can satisfy P2 by satisfying:

$P2^a$. If a proposal with value v is chosen, then every higher-numbered proposal accepted by any acceptor has value v.

We still maintain P1 to ensure that some proposal is chosen. Because communication is asynchronous, a proposal could be chosen with some particular acceptor c never having received any proposal. Suppose a new proposer "wakes up" and issues a higher-numbered proposal with a different value. P1 requires c to accept this proposal, violating $P2^a$. Maintaining both P1 and $P2^a$ requires strengthening $P2^a$ to:

$P2^b$. If a proposal with value v is chosen, then every higher-numbered proposal issued by any proposer has value v.

Since a proposal must be issued by a proposer before it can be accepted by an acceptor, P2b implies P2a, which in turn implies P2.

To discover how to satisfy P2b, let's consider how we would prove that it holds. We would assume that some proposal with number m and value v is chosen and show that any proposal issued with number n>m also has value v. We would make the proof easier by using induction on n, so we can prove that proposal number n has value v under the additional assumption that every proposal issued with a number in m . . . (n−1) has value v, where i . . . j denotes the set of numbers from i through j. For the proposal numbered m to be chosen, there must be some set C consisting of a majority of acceptors such that every acceptor in C accepted it. Combining this with the induction assumption, the hypothesis that m is chosen implies:

Every acceptor in C has accepted a proposal with number in m . . . (n−1), and every proposal with number in m . . . (n−1) accepted by any acceptor has value v.

Since any set S consisting of a majority of acceptors contains at least one member of C, we can conclude that a proposal numbered n has value v by ensuring that the following invariant is maintained:

$P2^c$. For any v and n, if a proposal with value v and number n is issued, then there is a set S consisting of a majority of acceptors such that either (a) no acceptor in S has accepted any proposal numbered less than n, or (b) v is the value of the highest-numbered proposal among all proposals numbered less than n accepted by the acceptors in S.

We can therefore satisfy $P2^b$ by maintaining the invariance of $P2^c$.

To maintain the invariance of $P2^c$, a proposer that wants to issue a proposal numbered n must learn the highest-numbered proposal with number less than n, if any, that has been or will be accepted by each acceptor in some majority of acceptors. Learning about proposals already accepted is easy enough; predicting future acceptances is hard. Instead of trying to predict the future, the proposer controls it by extracting a promise that there will not be any such acceptances. In other words, the proposer requests that the acceptors not accept any more proposals numbered less than n. This leads to the following algorithm for issuing proposals.

1. A proposer chooses a new proposal number n and sends a request to each member of some set of acceptors, asking it to respond with:
   (a) A promise never again to accept a proposal numbered less than n, and (b) The proposal with the highest number less than n that it has accepted, if any.

Such request is referred to as a "prepare request" with number n.

2. If the proposer receives the requested responses from a majority of the acceptors, then it can issue a proposal with number n and value v, where v is the value of the highest-numbered proposal among the responses, or is any value selected by the proposer if the responders reported no proposals.

A proposer issues a proposal by sending, to some set of acceptors, a request that the proposal be accepted. (This need not be the same set of acceptors that responded to the initial requests.) This will be referred to as an accept request.

An acceptor can receive two kinds of requests from proposers: prepare requests and accept requests. An acceptor can ignore any request without compromising safety. So, we need to say only when it is allowed to respond to a request. It can always respond to a prepare request. It can respond to an accept request, accepting the proposal, if and only if it has not promised not to. In other words:

$P1^a$. An acceptor can accept a proposal numbered n iff it has not responded to a prepare request having a number greater than n.

Observe that $P1^a$ subsumes P1. We now have a complete algorithm for choosing a value that satisfies the required safety properties—assuming unique proposal numbers. The final algorithm is obtained by making one small optimization. Suppose an acceptor receives a prepare request numbered n, but it has already responded to a prepare request numbered greater than n, thereby promising not to accept any new proposal numbered n. There is then no reason for the acceptor to respond to the new prepare request, since it will not accept the proposal numbered n that the proposer wants to issue. So we have the acceptor ignore such a prepare request. We also have it ignore a prepare request for a proposal it has already accepted.

With this optimization, an acceptor needs to remember only the highest numbered proposal that it has ever accepted and the number of the highest numbered prepare request to which it has responded. Because $P2^c$ must be kept invariant regardless of failures, an acceptor must remember this information even if it fails and then restarts. Note that the proposer can always abandon a proposal and forget all about it—as long as it never tries to issue another proposal with the same number.

Putting the actions of the proposer and acceptor together, we see that the algorithm operates in the following two phases.

Phase 1
(a) A proposer selects a proposal number n and sends a prepare request with number n to a majority of acceptors.
(b) If an acceptor receives a prepare request with number n greater than that of any prepare request to which it has already responded, then it responds to the request with a promise not to accept any more proposals numbered less than n and with the highest-numbered proposal (if any) that it has accepted.

Phase 2
(a) If the proposer receives a response to its prepare requests (numbered n) from a majority of acceptors, then it sends an accept request to each of those acceptors for a proposal numbered n with a value v, where v is the value of the highest-numbered proposal among the responses, or is any value if the responses reported no proposals.

(b) If an acceptor receives an accept request for a proposal numbered n, it accepts the proposal unless it has already responded to a prepare request having a number greater than n.

A proposer can make multiple proposals, so long as it follows the algorithm for each one. It can abandon a proposal in the middle of the protocol at any time. Correctness is maintained, even though requests and/or responses for the proposal may arrive at their destinations long after the proposal was abandoned. It is probably a good idea to abandon a proposal if some proposer has begun trying to issue a higher-numbered one. Therefore, if an acceptor ignores a prepare or accept request because it has already received a prepare request with a higher number, then it should probably inform the proposer, who should then abandon its proposal. This is a performance optimization that does not affect correctness.

Consider now the notion of learning a chosen value. To learn that a value has been chosen, a learner finds out that a proposal has been accepted by a majority of acceptors. One way to do so is to have each acceptor, whenever it accepts a proposal, respond to all learners, sending them the proposal. This allows learners to find out about a chosen value as soon as possible, but it requires each acceptor to respond to each learner—a number of responses equal to the product of the number of acceptors and the number of learners.

The assumption of non-Byzantine failures makes it easy for one learner to find out from another learner that a value has been accepted. We can have the acceptors respond with their acceptances to a distinguished learner, which in turn informs the other learners when a value has been chosen. This approach requires an extra round for all the learners to discover the chosen value. It is also less reliable, since the distinguished learner could fail. But it requires a number of responses equal only to the sum of the number of acceptors and the number of learners.

More generally, the acceptors could respond with their acceptances to some set of distinguished learners, each of which can then inform all the learners when a value has been chosen. Using a larger set of distinguished learners provides greater reliability at the cost of greater communication complexity.

Because of message loss, a value could be chosen with no learner ever finding out. The learner could ask the acceptors what proposals they have accepted, but failure of an acceptor could make it impossible to know whether or not a majority had accepted a particular proposal. In that case, learners will find out what value is chosen only when a new proposal is chosen. If a learner needs to know whether a value has been chosen, it can have a proposer issue a proposal, using the algorithm described above.

Consider now the issue of progress and how to guarantee that progression of the algorithm proceeds in a productive way. Consider a scenario in which two proposers each keep issuing a sequence of proposals with increasing numbers, none of which are ever chosen. Proposer p completes phase 1 for a proposal number $n_1$. Another proposer q then completes phase 1 for a proposal number $n_2 > n_1$. Proposer p's phase 2 accept requests for a proposal numbered $n_1$ are ignored because the acceptors have all promised not to accept any new proposal numbered less than $n_2$. So, proposer p then begins and completes phase 1 for a new proposal number $n_3 > n_2$, causing the second phase 2 accept requests of proposer q to be ignored, and so on.

To guarantee progress, a distinguished proposer is selected as the only one to try issuing proposals. If the distinguished proposer can communicate successfully with a majority of acceptors, and if it uses a proposal with number greater than any already used, then it will succeed in issuing a proposal that is accepted. By abandoning a proposal and trying again if it learns about some request with a higher proposal number, the distinguished proposer will eventually choose a high enough proposal number.

If enough of the system (proposer, acceptors, and communication network) is working properly, liveness can therefore be achieved by electing a single distinguished proposer. A reliable algorithm for electing a proposer can use either randomness or real time—for example, by using timeouts. However, safety is ensured regardless of the success or failure of the election.

Consider now some implementation issues. The Paxos algorithm assumes a network of processes. In its consensus algorithm, each process plays the role of proposer, acceptor, and learner. The algorithm chooses a leader, which plays the roles of the distinguished proposer and the distinguished learner. The Paxos consensus algorithm is the one described above, where requests and responses are sent as ordinary messages. Response messages are tagged with the corresponding proposal number to prevent confusion. Stable storage, preserved during failures, is used to maintain the information that the acceptor is to remember. An acceptor records its intended response in stable storage before actually sending the response.

All that remains is to describe the mechanism for guaranteeing that no two proposals are ever issued with the same number. Different proposers choose their numbers from disjoint sets of numbers, so two different proposers never issue a proposal with the same number. Each proposer remembers, in stable storage, the highest-numbered proposal it has tried to issue, and begins phase 1 with a higher proposal number than any it has already used.

Consider now, implementation of a state machine against the backdrop of the Paxos algorithm.

One way to implement a distributed system is as a collection of clients that issue commands to a central server. The server can be described as a deterministic state machine that performs client commands in some sequence. The state machine has a current state; it performs a step by taking as input a command and producing an output and a new state. For example, the clients of a distributed banking system might be tellers, and the state-machine state might consist of the account balances of all users. A withdrawal would be performed by executing a state machine command that decreases an account's balance if and only if the balance is greater than the amount withdrawn, producing as output the old and new balances. An implementation that uses a single central server fails if that server fails. We therefore instead use a collection of servers, each one independently implementing the state machine. Because the state machine is deterministic, all the servers will produce the same sequences of states and outputs if they all execute the same sequence of commands. A client issuing a command can then use the output generated for it by any server.

To guarantee that all servers execute the same sequence of state machine commands, we implement a sequence of separate instances of the Paxos consensus algorithm, the value chosen by the $i^{th}$ instance being the $i^{th}$ state machine command in the sequence. Each server plays all the roles (proposer, acceptor, and learner) in each instance of the algorithm. For purposes of this example, assume that the set of servers is fixed, so all instances of the consensus algorithm use the same sets of agents.

In normal operation, a single server is elected to be the leader, which acts as the distinguished proposer (i.e., the only one that tries to issue proposals) in all instances of the consensus algorithm. Clients send commands to the leader, who decides where in the sequence each command should appear. If the leader decides that a certain client command should be the $135^{th}$ command, it tries to have that command chosen as the value of the $135^{th}$ instance of the consensus algorithm. It will usually succeed. It might fail because of failures, or because another server also believes itself to be the leader and has a different idea of what the $135^{th}$ command should be. But the consensus algorithm ensures that at most one command can be chosen as the $135^{th}$ one.

The efficiency of this approach is enhanced, in the Paxos consensus algorithm, because the value to be proposed is not chosen until phase 2. Recall that, after completing phase 1 of the proposer's algorithm, either the value to be proposed is determined or else the proposer is free to propose any value.

Consider now how the Paxos state machine implementation works during normal operation. Consider what happens when the previous leader has just failed and a new leader has been selected. The new leader, being a learner in all instances of the consensus algorithm, should know most of the commands that have already been chosen. Suppose it knows commands 1-134, 138, and 139—that is, the values chosen in instances 1-134, 138, and 139 of the consensus algorithm. It then executes phase 1 of instances 135-137 and of all instances greater than 139. Suppose that the outcome of these executions determine the value to be proposed in instances 135 and 140, but leaves the proposed value unconstrained in all other instances. The leader then executes phase 2 for instances 135 and 140, thereby choosing commands 135 and 140.

The leader, as well as any other server that learns all the commands the leader knows, can now execute commands 1-135. However, it cannot execute commands 138-140, which it also knows, because commands 136 and 137 have yet to be chosen. The leader could take the next two commands requested by clients to be commands 136 and 137. Instead, we let it fill the gap immediately by proposing, as commands 136 and 137, a special "noop" command that leaves the state unchanged. It does this by executing phase 2 of instances 136 and 137 of the consensus algorithm. Once these "noop" commands have been chosen, commands 138-140 can be executed.

Commands 1-140 have now been chosen. The leader has also completed phase 1 for all instances greater than 140 of the consensus algorithm, and it is free to propose any value in phase 2 of those instances. It assigns command number 141 to the next command requested by a client, proposing it as the value in phase 2 of instance 141 of the consensus algorithm. It proposes the next client command it receives as command 142, and so on.

The leader can propose command 142 before it learns that its proposed command 141 has been chosen. It is possible for all the messages it sent in proposing command 141 to be lost, and for command 142 to be chosen before any other server has learned what the leader proposed as command 141. When the leader fails to receive the expected response to its phase 2 messages in instance 141, it will retransmit those messages. If all goes well, its proposed command will be chosen. However, it could fail first, leaving a gap in the sequence of chosen commands. In general, suppose a leader can get α commands ahead—that is, it can propose commands i+1 through i+α after commands 1 through i are chosen. A gap of up to α−1 commands could then arise.

A newly chosen leader executes phase 1 for infinitely many instances of the consensus algorithm—in the scenario above, for instances 135-137 and all instances greater than 139. Using the same proposal number for all instances, it can do this by sending a single reasonably short message to the other servers. In phase 1, an acceptor responds with more than a simple OK only if it has already received a phase 2 message from some proposer. In the scenario, this was the case only for instances 135 and 140. Thus, a server, acting as acceptor, can respond for all instances with a single reasonably short message. Executing these infinitely many instances of phase 1 therefore poses no problem.

Since failure of the leader and election of a new one should be rare events, the effective cost of executing a state machine command—that is, of achieving consensus on the command/value—is the cost of executing only phase 2 of the consensus algorithm. It can be shown that phase 2 of the Paxos consensus algorithm has the minimum possible cost of any algorithm for reaching agreement in the presence of faults. Hence, the Paxos algorithm is essentially optimal.

This discussion of the normal operation of the system assumes that there is always a single leader, except for a brief period between the failure of the current leader and the election of a new one. In abnormal circumstances, the leader election might fail. If no server is acting as leader, then no new commands will be proposed. If multiple servers think they are leaders, then they can all propose values in the same instance of the consensus algorithm, which could prevent any value from being chosen. However, safety is preserved—two different servers will never disagree on the value chosen as the $i^{th}$ state machine command. Election of a single leader is needed only to ensure progress.

If the set of servers can change, then there must be some way of determining what servers implement what instances of the consensus algorithm. The easiest way to do this is through the state machine itself. The current set of servers can be made part of the state and can be changed with ordinary state-machine commands. We can allow a leader to get α commands ahead by letting the set of servers that execute instance i+α of the consensus algorithm be specified by the state after execution of the $i^{th}$ state machine command. This permits a simple implementation of an arbitrarily sophisticated reconfiguration algorithm.

The above discussion constitutes a description of how the Paxos algorithm can be utilized to implement a fault tolerant distributed system. The Paxos protocol includes other family members or variants that can be utilized in connection with the embodiments described herein. These other family members include, by way of example and not limitation, so-called Multi-Paxos, Cheap Paxos, Fast Paxos, and *Byzantine* Paxos. These other family members can be utilized in the various embodiments described below.

Having discussed Distributed Agreement Protocols, and given an example of a specific protocol, i.e. the Paxos Protocol and its related family members, consider now a brief discussion of CRUD (Create, Read, Update, Delete) protocols and, in particular, the Hypertext Transport Protocol (HTTP).

CRUD Protocols Including HTTP

CRUD (Create, Read, Update, Delete) protocols refer to a family of protocols that allow for the creation, reading, updating and deletion of resources. One type of a CRUD protocol is the Hypertext Transfer Protocol (HTTP). The Hypertext Transfer Protocol (HTTP) is an application protocol for distributed, collaborative, hypermedia information systems and is the foundation of data communication for the World WideWeb.

HTTP functions as a request-response protocol in the client-server computing model. In HTTP, a web browser, for example, acts as a client, while an application running on a computer hosting a web site functions as a server. The client submits an HTTP request message to the server. The server, which stores content or provides resources, such as HTML files, or performs on behalf of the client, returns a response message to the client. A response contains completion status information about the request and may contain any content requested by the client in its message body.

A web browser (or client) is often referred to as a user agent (UA). Other user agents can include the indexing software used by search providers, known as web crawlers, or variations of the web browser such as voice browsers, which present an interactive voice user interface.

HTTP is an Application Layer protocol designed within the framework of the Internet Protocol Suite. The protocol definitions presume a reliable Transport Layer protocol for host-to-host data transfer. The Transmission Control Protocol (TCP) is the dominant protocol in use for this purpose. However, HTTP can be used with other protocols such as the User Datagram Protocol (UDP) and methods such as the Simple Service Discovery Protocol (SSDP).

HTTP Resources are identified and located on the network by Uniform Resource Identifiers (URIs)—or, more specifically, Uniform Resource Locators (URLs)—using the http or https URI schemes. URIs and the Hypertext Markup Language (HTML), form a system of inter-linked resources, called hypertext documents, on the Internet.

An HTTP session is a sequence of network request-response transactions. An HTTP client initiates a request by establishing a Transmission Control Protocol (TCP) connection to a particular port on a server. An HTTP server listening on that port waits for a client's request message. Upon receiving the request, the server sends back a status line, such as an HTTP/200 "OK", and a message of its own. The body of this message is typically the requested resource, although an error message or other information may also be returned.

HTTP defines nine methods (sometimes referred to as "verbs") indicating the desired action to be performed on the identified resource. What this resource represents, whether pre-existing data or data that is generated dynamically, depends on the implementation of the server. Often, the resource corresponds to a file or the output of an executable residing on the server.

| HTTP Verb | Definition |
| --- | --- |
| HEAD | Asks for the response identical to the one that would correspond to a GET request, but without the response body. This is useful for retrieving meta-information written in response headers, without having to transport the entire content. |
| GET | Requests a representation of the specified resource. |
| POST | Submits data to be processed (e.g., from an HTML form) to the identified resource. The data is included in the body of the request. This may result in the creation of a new resource or the updates of existing resources or both. |
| PUT | Uploads a representation of the specified resource. |
| DELETE | Deletes the specified resource. |
| TRACE | Echoes back the received request, so that a client can see what (if any) changes or additions have been made by intermediate servers. |

-continued

| HTTP Verb | Definition |
| --- | --- |
| OPTIONS | Returns the HTTP methods that the server supports for specified URL. This can be used to check the functionality of a web server by requesting '*' instead of a specific resource. |
| CONNECT | Converts the request connection to a transparent TCP/IP tunnel, usually to facilitate SSL encrypted communication (HTTPS) through an unencrypted HTTP proxy. |
| PATCH | Is used to apply partial modifications to a resource. |

Having discussed various aspects of the HTTP protocol, consider now how CRUD-type protocols can be bound as a state machine utilizing a Distributed Agreement Protocol.

Binding CRUD-Type Protocols as a State Machine

Figure 2:
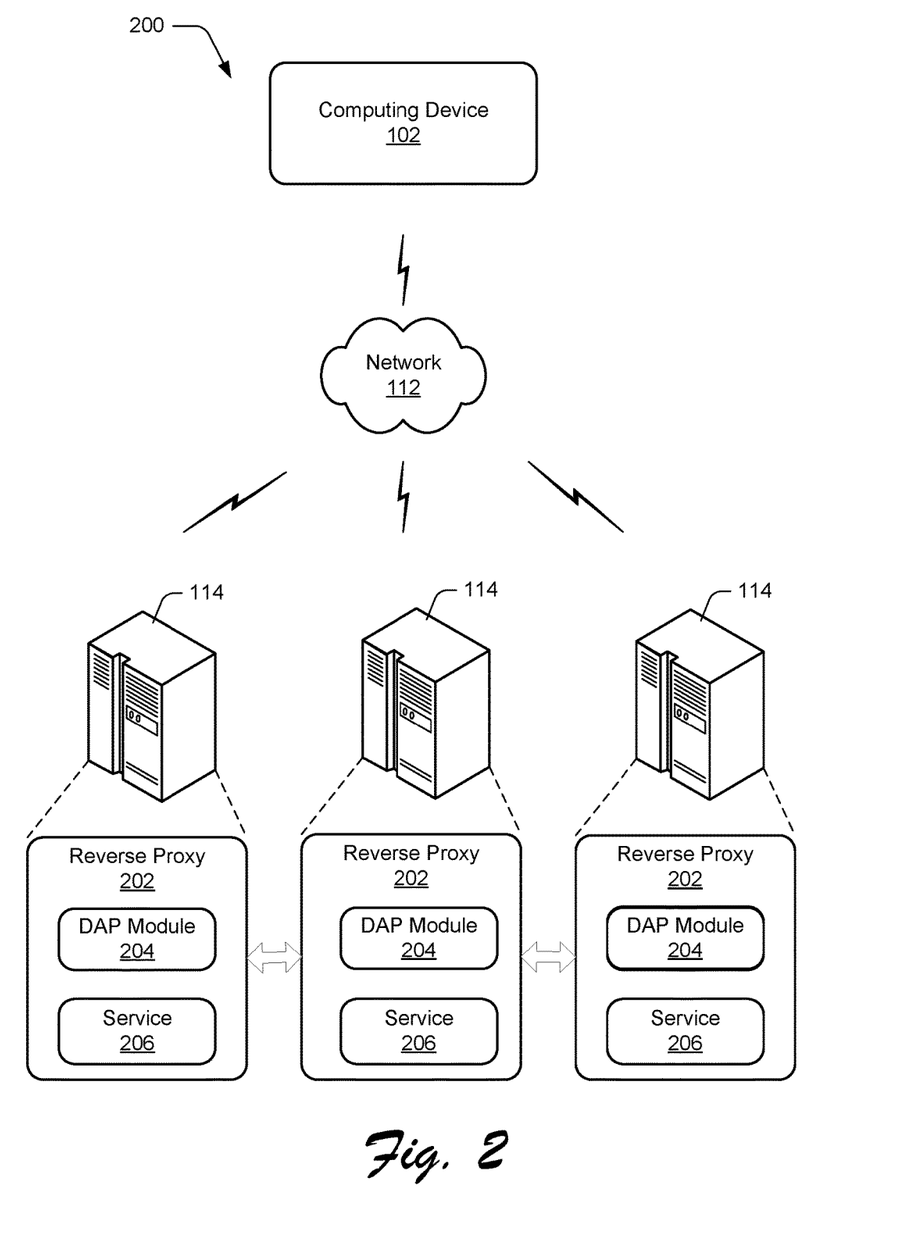
FIG. 2 illustrates an example operating environment in accordance with one or more embodiments.

FIG. 2 illustrates a system, generally at 200, in which a CRUD-type protocol can be bound as a state machine utilizing a Distributed Agreement Protocol in accordance with one or more embodiments. In the discussion that follows, like numerals from the FIG. 1 embodiment are utilized to depict like components. It is to be appreciated and understood, however, that the techniques described in this document can be employed in connection with any suitable stateless REST (Representational State Transfer) protocols.

In this example, computing device 102 communicates, via network 112 with one or more servers 114. Any suitable protocol can be utilized to enable computing device 102 to communicate with servers 114. In the illustrated and described embodiment, communication can take place utilizing a CRUD-type protocol. In a specific implementation, the CRUD-type protocol comprises HTTP.

Each server, in this particular example, includes a reverse proxy 202. The reverse proxy implements an instance of a Distributed Agreement Protocol (DAP) which resides in the form of DAP module 204. In addition, each server 114 implements one or more web services, here represented by service 206, such as a web or "cloud" service. Each service 206 implemented by the individual servers constitutes a replica or redundant service.

In operation, each server 114 constitutes a node in a distributed system in which service 206 is offered. Typically, although not always, the servers are geographically distributed at different physical locations. For example, the individual servers might comprise servers that are located in data centers across a particular country or distributed throughout the world. Alternately, the servers might constitute individual blade servers in a single rack. Each server, through its DAP module 204, runs in instance of a Distributed Agreement Protocol. In at least some embodiments, the Distributed Agreement Protocol comprises the Paxos protocol.

Using a CRUD-type protocol, such as HTTP, the computing device 102 issues operations using, for example, verbs associated with a particular protocol. In the context of HTTP, such verbs can include GET, PUT, POST, PATCH, DELETE, and the like. The client computing device 102 can communicate with any node, i.e. server 114, in the distributed system. As the server 114 receives the operations from the computing device 102, it captures the operations and, utilizing the DAP module 204, chooses an ordering for them. Specifically, using the Distributed Agreement Protocol, communication takes place between the reverse proxies 202 on each server. Through the communication between the servers, the Distributed Agreement Protocol is utilized to come to a consensus as to the ordering of operations that are to be performed.

Once the order of operations has been agreed upon utilizing, for example, the Paxos protocol described above, each node, i.e. server, can execute the operations in the agreed-upon order in the context of service 206. In this manner, the CRUD-type protocol which in this instance is HTTP, is bound as a state machine using the Distributed Agreement Protocol.

In essence then, the Distributed Agreement Protocol enables receipt of operations from various clients that can be widely distributed. The operations can arrive in any arbitrary order and can be associated with any service, i.e. "cloud service". Using the Distributed Agreement Protocol, a server can construct a sequential ordering of operations as between multiple different servers that ensures that the same sequential ordering across all of the servers or nodes is the same. As a result, each node will be in the same state with respect operations that are to be, or have been, performed.

Utilizing the Distributed Agreement Protocol in connection with web services that are implemented using a CRUD-type protocol can facilitate operation when, for example, individual nodes or servers within a distributed system may become inoperative.

As an example of a web service that can be implemented using the techniques described above, consider a web service that maintains a contact list for individual users. In this particular contact list service, a user can insert a new contact, view contacts, update contacts, and delete contacts. Assume also that the contact list service is implemented in a distributed fashion using servers, such as those servers described above. Assume also that the user can interact with the contact list service using multiple different types of client devices. For example, for example, a user may want interact with the contact list service to the personal computer, their phone, a web browser, or any type of client.

In order to interact with their particular contact list, the client device issues operations in the form of HTTP verbs. For example, if a user wishes to view all of their contacts, through a suitably-configured user interface, the user would cause an HTTP GET operation to be issued. Similarly, to update a contact an HTTP MERGE operation would be issued. Deleting a contact would occur through an HTTP DELETE operation, and inserting a new contact would occur through issuance of a POST operation.

Because the contact list service is implemented in a distributed fashion on multiple different servers, when operations are issued by a client device, the Distributed Agreement Protocol executed by each server or, more accurately, by the reverse proxy on each server, ensures that an agreed-upon order of operations occurs on each server. In this manner, a user's contact list can remain synchronized across nodes, i.e. servers, in the distributed system.

Having considered how a CRUD-type protocol can be bound as a state machine using a Distributed Agreement Protocol, consider now an example method in accordance with one or more embodiments.

Example Method

Figure 3:
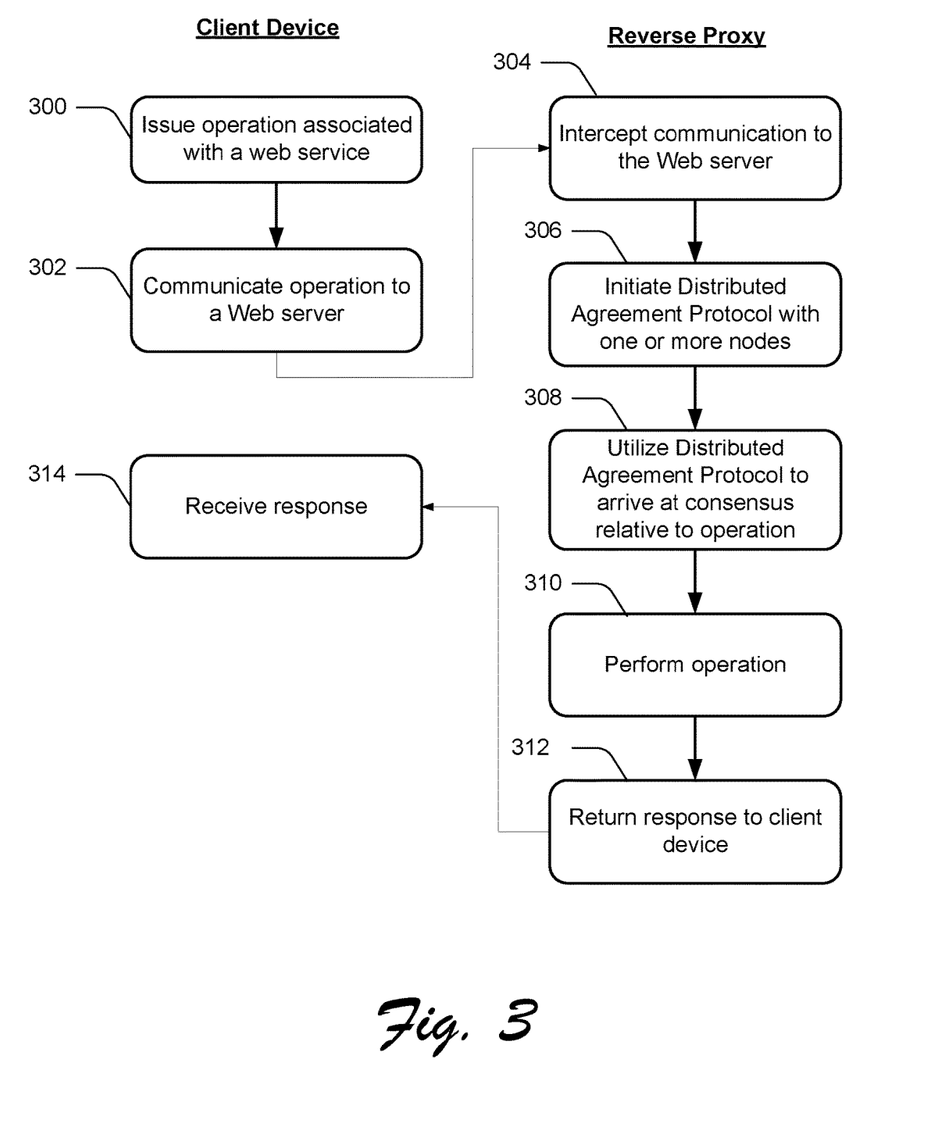
FIG. 3 is a flow diagram that describes steps in a method in accordance with one or more embodiments.

FIG. 3 is a flow diagram that describes steps a method in accordance with one or more embodiments. The method can be implemented in connection with any suitable hardware, software, firmware, or combination thereof. In at least some embodiments, the method can be implemented, at least in part, by a suitably-configured client device and one or more suitably-configured servers. To this end, a portion of the illustrated flow diagram is designated as "Client Device" to depict acts that are performed by a client device. Likewise, another portion of the flow diagram is designated as "Reverse Proxy" to designate those acts, or at least some of those acts that can be performed by, or on behalf of a reverse proxy, such as those described above.

Step 300 issues an operation associated with a web service. Any suitable operation can be issued in connection with any suitable web service. In at least some embodiments, the operation is associated with a CRUD-type operation. In a specific implementation, the operation is associated with an HTTP operation such as those described above. Step 302 communicates the operation to a RESTful Web server—i.e., one that conforms to or utilizes a RESTful protocol, such as a CRUD-type protocol. In the illustrated and described embodiment, the web server implements the web service and comprises part of a distributed system in which one or more other Web servers implement a redundant or replica of the web service.

Step 304 intercepts or receives the communication to the RESTful Web server. As noted above, this step can be performed by a suitably-configured reverse proxy. In the illustrated and described embodiment, the reverse proxy supports or is otherwise configured to utilize a Distributed Agreement Protocol, such as those mentioned above. In a specific implementation, the Distributed Agreement Protocol comprises the Paxos protocol. Step 306 initiates the Distributed Agreement Protocol with one or more nodes. This step can be performed in any suitable way. In the illustrated and described embodiment, each node corresponds to another RESTful Web server that implements the redundant web service mentioned above. Step 308 utilizes the Distributed Agreement Protocol to arrive at a consensus relative to the operation. Utilization of the Distributed Agreement Protocol can take place through intra-communication between the various servers that support or expose redundant web service. Examples of such intra-communication are provided above. Having arrived at a consensus using the Distributed Agreement Protocol, step 310 performs or enables performance of an associated operation. Performance of the operation occurs in the order as ascertained through the consensus between the RESTful Web servers or, more accurately, the reverse proxies utilized by each Web server. Having performed the operation, step 312 returns a suitable response to the client device. Any suitable response can be returned. In at least some embodiments, the response that is returned resides in the form of an HTTP response.

Step 314 receives, at the client device, the response and processes the response in the usual manner.

Utilizing the above-described methodology, state can be maintained between multiple different servers that implement a redundant web service. Through the use of the Distributed Agreement Protocol in conjunction with the RESTful-type protocol, e.g., the CRUD-type protocol, RESTful Web servers can be operated in lock step so as to preserve state and remain synchronized with respect to operations that are performed across the Web servers.

Having considered various embodiments, consider now an example system and device that can be utilized to implement the embodiments described above.

Example System and Device

Figure 4:
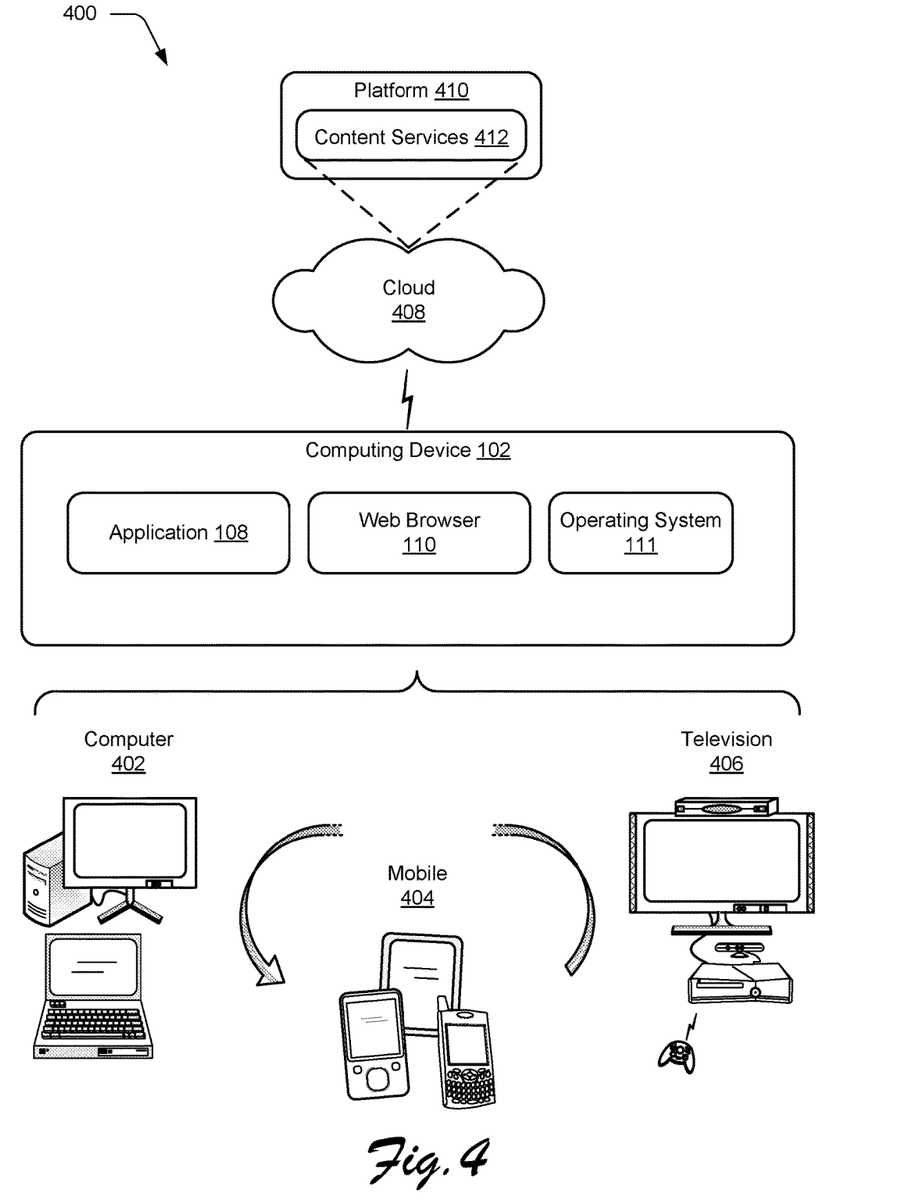
FIG. 4 illustrates an example system in accordance with one or more embodiments.

FIG. 4 illustrates an example system 400 that includes the computing device 102 as described with reference to FIG. 1. The example system 400 enables ubiquitous environments for a seamless user experience when running applications on a personal computer (PC), a television device, and/or a mobile device. Services and applications run substantially similar in all three environments for a common user experience when transitioning from one device to the next while utilizing an application, playing a video game, watching a video, and so on.

In the example system 400, multiple devices are interconnected through a central computing device. The central computing device may be local to the multiple devices or may be located remotely from the multiple devices. In one embodiment, the central computing device may be a cloud of one or more server computers that are connected to the multiple devices through a network, the Internet, or other data communication link. In one embodiment, this interconnection architecture enables functionality to be delivered across multiple devices to provide a common and seamless experience to a user of the multiple devices. Each of the multiple devices may have different physical requirements and capabilities, and the central computing device uses a platform to enable the delivery of an experience to the device that is both tailored to the device and yet common to all devices. In one embodiment, a class of target devices is created and experiences are tailored to the generic class of devices. A class of devices may be defined by physical features, types of usage, or other common characteristics of the devices.

In various implementations, the computing device 102 may assume a variety of different configurations, such as for computer 402, mobile 404, and television 406 uses. Each of these configurations includes devices that may have generally different constructs and capabilities, and thus the computing device 102 may be configured according to one or more of the different device classes. For instance, the computing device 102 may be implemented as the computer 402 class of a device that includes a personal computer, desktop computer, a multi-screen computer, laptop computer, netbook, and so on. Each of these different configurations may employ the techniques described herein, as illustrated through inclusion of the application(s) 108, Web browser 110, and operating system 111.

The computing device 102 may also be implemented as the mobile 404 class of device that includes mobile devices, such as a mobile phone, portable music player, portable gaming device, a tablet computer, a multi-screen computer, and so on. The computing device 102 may also be implemented as the television 406 class of device that includes devices having or connected to generally larger screens in casual viewing environments. These devices include televisions, set-top boxes, gaming consoles, and so on. The techniques described herein may be supported by these various configurations of the computing device 102 and are not limited to the specific examples the techniques described herein.

The cloud 408 includes and/or is representative of a platform 410 for content services 412. The platform 410 abstracts underlying functionality of hardware (e.g., servers) and software resources of the cloud 408. The content services 412 may include applications and/or data that can be utilized while computer processing is executed on servers that are remote from the computing device 102. Content services 412 (e.g., cloud services or web services) can be provided as a service over the Internet and/or through a subscriber network, such as a cellular or Wi-Fi network.

The platform 410 may abstract resources and functions to connect the computing device 102 with other computing devices. The platform 410 may also serve to abstract scaling of resources to provide a corresponding level of scale to encountered demand for the content services 412 that are implemented via the platform 410. Accordingly, in an interconnected device embodiment, implementation of functionality described herein may be distributed throughout the system 400. For example, the functionality may be implemented in part on the computing device 102 as well as via the platform 410 that abstracts the functionality of the cloud 408.

Figure 5:
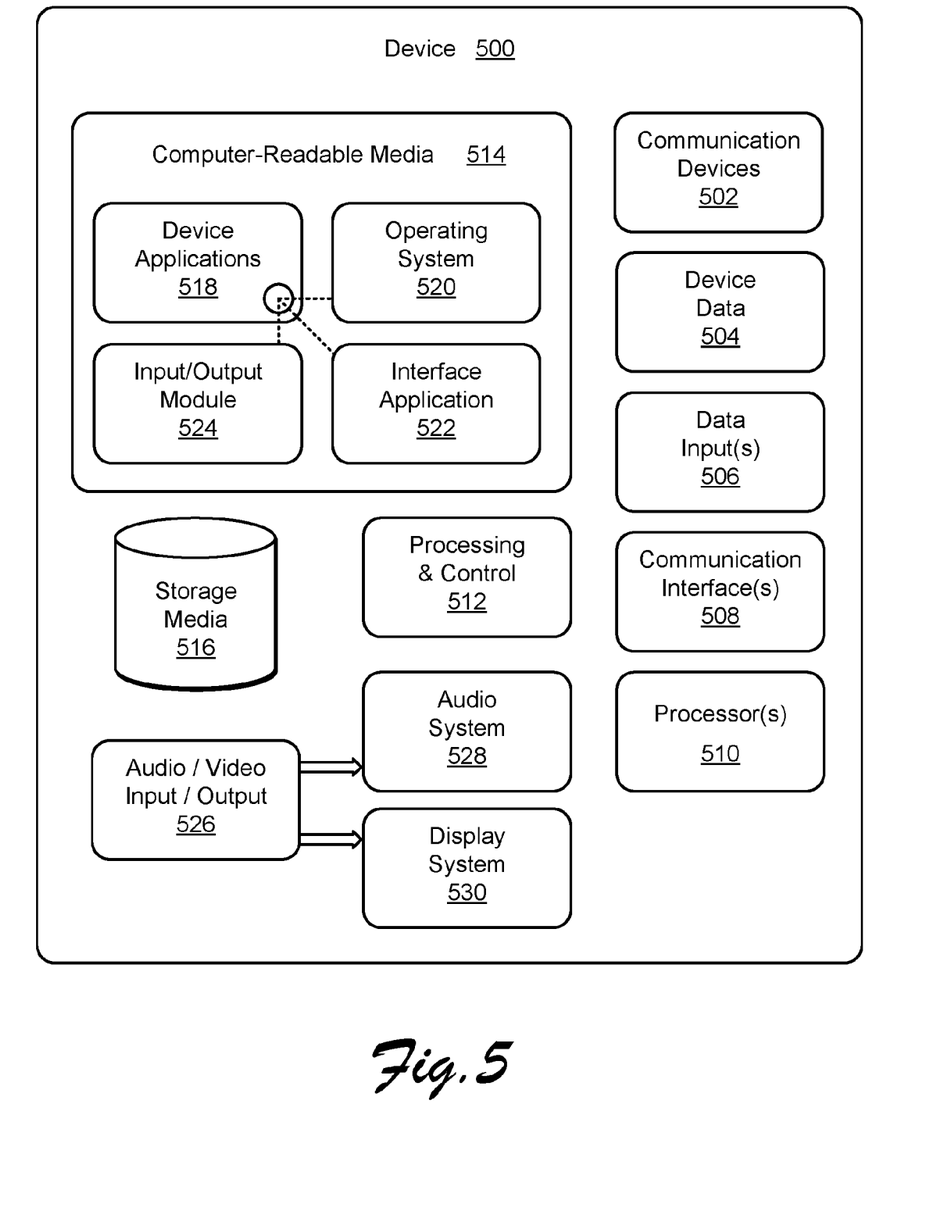
FIG. 5 illustrates an example device in accordance with one or more embodiments.

FIG. 5 illustrates various components of an example device 500 that can be implemented as any type of computing device as described above to implement embodiments of the techniques described herein. Device 500 includes communication devices 502 that enable wired and/or wireless communication of device data 504 (e.g., received data, data that is being received, data scheduled for broadcast, data packets of the data, etc.). The device data 504 or other device content can include configuration settings of the device, media content stored on the device, and/or information associated with a user of the device. Media content stored on device 500 can include any type of audio, video, and/or image data. Device 500 includes one or more data inputs 506 via which any type of data, media content, and/or inputs can be received, such as user-selectable inputs, messages, music, television media content, recorded video content, and any other type of audio, video, and/or image data received from any content and/or data source.

Device 500 also includes communication interfaces 508 that can be implemented as any one or more of a serial and/or parallel interface, a wireless interface, any type of network interface, a modem, and as any other type of communication interface. The communication interfaces 508 provide a connection and/or communication links between device 500 and a communication network by which other electronic, computing, and communication devices communicate data with device 500.

Device 500 includes one or more processors 510 (e.g., any of microprocessors, controllers, and the like) which process various computer-executable instructions to control the operation of device 500 and to implement embodiments of the techniques described herein. Alternatively or in addition, device 500 can be implemented with any one or combination of hardware, firmware, or fixed logic circuitry that is implemented in connection with processing and control circuits which are generally identified at 512. Although not shown, device 500 can include a system bus or data transfer system that couples the various components within the device. A system bus can include any one or combination of different bus structures, such as a memory bus or memory controller, a peripheral bus, a universal serial bus, and/or a processor or local bus that utilizes any of a variety of bus architectures.

Device 500 also includes computer-readable media 514, such as one or more memory components, examples of which include random access memory (RAM), non-volatile memory (e.g., any one or more of a read-only memory (ROM), flash memory, EPROM, EEPROM, etc.), and a disk storage device. A disk storage device may be implemented as any type of magnetic or optical storage device, such as a hard disk drive, a recordable and/or rewriteable compact disc (CD), any type of a digital versatile disc (DVD), and the like. Device 500 can also include a mass storage media device 516.

Computer-readable media 514 provides data storage mechanisms to store the device data 504, as well as various device applications 518 and any other types of information and/or data related to operational aspects of device 500. For example, an operating system 520 can be maintained as a computer application with the computer-readable media 514 and executed on processors 510. The device applications 518 can include a device manager (e.g., a control application, software application, signal processing and control module, code that is native to a particular device, a hardware abstraction layer for a particular device, etc.). The device applications 518 also include any system components or modules to implement embodiments of the techniques described herein. In this example, the device applications 518 include an interface application 522 and an input/output module 524 that are shown as software modules and/or computer applications. The input/output module 524 is representative of software that is used to provide an interface with a device configured to capture inputs, such as a touchscreen, track pad, camera, microphone, and so on. Alternatively or in addition, the interface application 522 and the input/output module 524 can be implemented as hardware, software, firmware, or any combination thereof. Additionally, the input/output module 524 may be configured to support multiple input devices, such as separate devices to capture visual and audio inputs, respectively.

Device 500 also includes an audio and/or video input-output system 526 that provides audio data to an audio system 528 and/or provides video data to a display system 530. The audio system 528 and/or the display system 530 can include any devices that process, display, and/or otherwise render audio, video, and image data. Video signals and audio signals can be communicated from device 500 to an audio device and/or to a display device via an RF (radio frequency) link, S-video link, composite video link, component video link, DVI (digital video interface), analog audio connection, or other similar communication link. In an embodiment, the audio system 528 and/or the display system 530 are implemented as external components to device 500. Alternatively, the audio system 528 and/or the display system 530 are implemented as integrated components of example device 500.

CONCLUSION

Various embodiments enable redundant or replica services, such as "cloud" services, to be run at geographically distributed locations. Each replica is capable of performing operations that are generally, identically performed across all replicas. In the event of an interruption at one location, services in other locations can quickly and automatically take over operations.

In one or more embodiments, a Distributed Agreement Protocol is utilized to bind a CRUD-type protocol as a state machine. Binding takes place through the use of a reverse proxy that is located at each of the locations at which the service is distributed. In at least some embodiments, the Distributed Agreement Protocol is implemented as the Paxos protocol or a variant thereof, and/or the CRUD-type protocol comprises the HTTP protocol.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method implemented in a computing system having a plurality of web servers, comprising:
 receiving communications from a client device to a first web server of the plurality of web servers via the Internet, the communications being associated with a plurality of operations that are requested by the client device and to be performed by a web service implemented by both the first web server and a second web server of the plurality of web servers;

responsive to the received communications, arriving at a consensus between the first web server and the second web server regarding an agreed-upon order of operations to be performed by the first web server and the second web server in response to the requested operations by the client device;

upon arriving at the consensus, generating a response to the requested operations by performing the requested operations in the agreed-upon order at both the first web server and the second web server, the web service at both the first web server and the second web server having the same state subsequent to performing the requested operations at the first web server and the second web server; and returning the generated response to the client device via the Internet.

2. The method of claim 1 wherein the web service implemented by the second web server is a replica of the web service implemented by the first web server.

3. The method of claim 1 wherein:
the first and second web servers each include a reverse proxy component; and
arriving at the consensus includes initiating communications between the reverse proxy components at the first and second web servers to arrive at the consensus.

4. The method of claim 1 wherein:
the first and second web servers each include a reverse proxy component; and
arriving at the consensus includes initiating communications according to a distributed agreement protocol between the reverse proxy components at the first and second web servers to arrive at the consensus.

5. The method of claim 1 wherein the web service implemented by the second web server is a replica of the web service implemented by the first web server, and wherein the first and second web servers are geographically-located differently.

6. The method of claim 1 wherein the operations requested by the client device include CRUD-type operations, and wherein arriving at the consensus includes initiating a Paxos protocol with reverse proxy components that reside at the first and second web servers to arrive at the consensus.

7. The method of claim 1 wherein the operations requested by the client device include HTTP operations, and wherein arriving at the consensus includes initiating a Paxos protocol with reverse proxy components that reside at the first and second web servers to arrive at the consensus.

8. A computing system having a plurality of web servers each having one or more processors and a memory containing instructions executable by the processors to cause the processors to perform a process comprising:
receiving, from a client device, a request to a first web server, the request being associated with operations to be performed by a web service implemented by the first web server;
responsive to the received request, initiating communications between the first web server and a second web server regarding an order of the operations to be performed in response to the request from the client device, the second web server implementing the same web service as the first web server;
arriving at a consensus between the first web server and the second web server regarding an agreed-upon order of the operations to be performed by the first web server and the second web server in response to the requested operation by the client device;
based on the arrived consensus, performing the operations in the agreed-upon order at both the first web server and the second web server to generate a response; and
returning, to the client device, the generated response via the Internet.

9. The computing system of claim 8 wherein performing the requested operation in the agreed-upon order includes performing the requested operation in the agreed-upon order at the first and second web servers and maintaining the same state of the web service at both the first and second web servers.

10. The computing system of claim 8 wherein initiating communications includes initiating communications according to a distributed agreement protocol between the first web server and the second web server regarding the order of the operations to be performed in response to the request from the client device.

11. The computing system of claim 8 wherein:
the first and second web servers each include a reverse proxy component; and
initiating communications includes initiating communications according to a distributed agreement protocol between reverse proxy components of the first web server and the second web server regarding the order of the operations to be performed in response to the request from the client device.

12. The computing system of claim 8 wherein:
the first and second web servers each include a reverse proxy component;
initiating communications includes initiating communications according to a distributed agreement protocol between reverse proxy components of the first web server and the second web server regarding the order of the operations to be performed in response to the request from the client device; and
arriving at the consensus includes utilizing the distributed agreement protocol to arrive at the consensus regarding the order of the operations to be performed in response to the request from the client device.

13. The computing system of claim 12 wherein the distributed agreement protocol comprises the Paxos protocol, and wherein the first and second web servers individually implement HTTP.

14. The computing system of claim 12 wherein the distributed agreement protocol comprises one other than the Paxos protocol, and wherein the first and second web servers individually implement HTTP.

15. The computing system of claim 8, further comprising:
responsive to the received request, initiating communications between the first web server, the second web server, and a third web server regarding an order of the operations to be performed in response to the request from the client device, the third web server implementing the same web service as the first web server and the second web server; and based on the arrived consensus, performing the operations in the agreed-upon order at the first web server, the second web server, and the third web server to generate the response.

16. A web server having one or more processors and a memory containing instructions executable by the processors to cause the processors to perform a process comprising:
receiving communications from a client device via a computer network, the communications being associated with a plurality of operations that are requested by the client device and to be performed by a web service implemented by the web server;

responsive to the received communications, arriving at a consensus between the web server and a peer web server regarding an agreed-upon order of operations to be performed by both the web server and the peer web server in response to the requested operations by the client device, the peer web server implementing the same web service as a replica of the web service implemented by the web server;

upon arriving at the consensus, generating a response to the requested operations by performing the requested operations in the agreed-upon order at both the web server and the peer web server; and returning the generated response to the client device via the computer network.

17. The web server of claim 16 wherein the web service at both the web server and the peer web server having the same state subsequent to performing the requested operations at the web server and the peer web server.

18. The web server of claim 16 wherein:

the web server and the peer web server each include a reverse proxy component; and arriving at the consensus includes initiating communications between the reverse proxy components at the web server and the peer web server to arrive at the consensus.

19. The web server of claim 16 wherein:

the web server and the peer web server each include a reverse proxy component; and arriving at the consensus includes initiating communications according to a distributed agreement protocol between the reverse proxy components at the web server and the peer web server to arrive at the consensus.

20. The web server of claim 16 wherein:

the web server and the peer web server each include a reverse proxy component;

the operations requested by the client device include HTTP operations; and arriving at the consensus includes initiating communications between the reverse proxy components according to a distributed agreement protocol at the web server and the peer web server to arrive at the consensus.

* * * * *